United States Patent
Bruckhaus

(10) Patent No.: US 7,607,046 B1
(45) Date of Patent: Oct. 20, 2009

(54) SYSTEM FOR PREDICTING AND PREVENTING ESCALATIONS

(75) Inventor: Tilmann Bruckhaus, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 455 days.

(21) Appl. No.: 11/123,401

(22) Filed: May 6, 2005

(51) Int. Cl.
*G06F 11/00* (2006.01)

(52) U.S. Cl. .......................... 714/38; 714/47; 702/185

(58) Field of Classification Search .................. 714/38, 714/47; 702/182–186
See application file for complete search history.

(56) References Cited

OTHER PUBLICATIONS

Bruckhaus, T., Ling, C.X., Madhavji, N.H., and Sheng, S. 2004. Software Escalation Prediction with Data Mining. Workshop on Predictive Software Models (PSM 2004), A STEP Software Technology & Engineering Practice.*

* cited by examiner

*Primary Examiner*—Scott T Baderman
*Assistant Examiner*—Jigar Patel
(74) *Attorney, Agent, or Firm*—Brooks Kushman P.C.

(57) ABSTRACT

In one embodiment, a method and apparatus for predicting and preventing escalations is disclosed. The method includes generating a predictive model from analysis of historical defect data and corresponding historical escalation data, and applying the predictive model to current defect data to determine an escalation risk of the current defect data.

17 Claims, 7 Drawing Sheets

SYSTEM FOR PREDICTING AND PREVENTING ESCALATIONS

FIELD OF INVENTION

An embodiment of the invention relates to software defects and escalations, and more specifically, to predicting and preventing escalations related to software products.

BACKGROUND OF INVENTION

Organizations that develop software systems typically receive and maintain collections of defect reports related to their software systems. Due to scarcity of resources, it is common that not all of the reported defects can be resolved before the software system is released. In such cases, it is beneficial to prioritize the collected defect reports so that the defects affecting the organization's success the most are addressed first. Commonly, defect reports are prioritized by attaching to each defect report attributes such as "priority," "severity," and other similar attributes. Such attributes are then assessed and assigned by the organization or by another party to disposition the defect report. Defects are then resolved in order based on their priority and severity.

However, this approach of prioritization may not be optimal for the organization's success for several reasons. First, the priority and severity ratings assigned to the defects are based on human judgment and may vary from person to person based on their skill and experience. Second, priority and severity ratings may sometimes be entered as higher or lower for idiosyncratic reasons. For instance, customers may overstate a severity in order to increase the visibility of issues affecting them, or engineers may understate the priority in order to reduce the workload of defects that need to be fixed before a release is shipped.

Due to the difficulty of assessing the priority of each defect, very severe defects are sometimes released with the product while less severe defects are fixed. When customers then experience severe defects they typically take action, such as forcing the software vendor to fix the defect immediately at a very high cost. In some cases, the customer may take legal action, depending on the legal terms of the relationship with the vendor. Typically, a loss of satisfaction and loyalty will result from encountering such severe defects, and this may lead to reduced repeat revenue for the vendor.

The situations where a customer encounters a severe defect, and where the vendor also suffers adverse consequences, may be referred to as "product defect escalations" or simply as "escalations." Different organizations may have different operational criteria for distinguishing "escalations" from "non-escalations." For example, defects which are brought to the awareness of the vendor's senior management may be considered "executive escalations," or defects which are routed to a specialized expert support organization of the vendor may be considered "escalations," or a combination of similar criteria may be used to define an "escalation." Some defects may be escalations when they are first reported, while other defects may be reported as non-escalations (i.e., ordinary defects) and then later become escalated.

A system to predict which ordinary defects will later become escalated may be beneficial to an organization. Such a system would allow these defects to be corrected proactivelty and at lower cost, as opposed to correcting them at a higher cost after an escalation occurs. The term "costs" here may refer to various types of costs such as labor cots, loss of customer satisfaction, loyalty, repeat revenue, and other similar types of costs and adverse consequences.

SUMMARY OF INVENTION

The present invention includes novel methods and apparatus for predicting and preventing escalations.

According to one embodiment of the invention, a method is disclosed. The method includes generating a predictive model from analysis of historical defect data and corresponding historical escalation data, and applying the predictive model to current defect data to determine an escalation risk of the current defect data.

According to another embodiment of the invention, an apparatus is disclosed. The apparatus includes an escalation prediction system to predict escalations. The escalation prediction system further includes a modeling and validation system to generate a predictive model from analysis of historical defect data and corresponding historical escalation data, and a defect risk scoring system to apply the predictive model to current defect data to determine an escalation risk of the defect.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
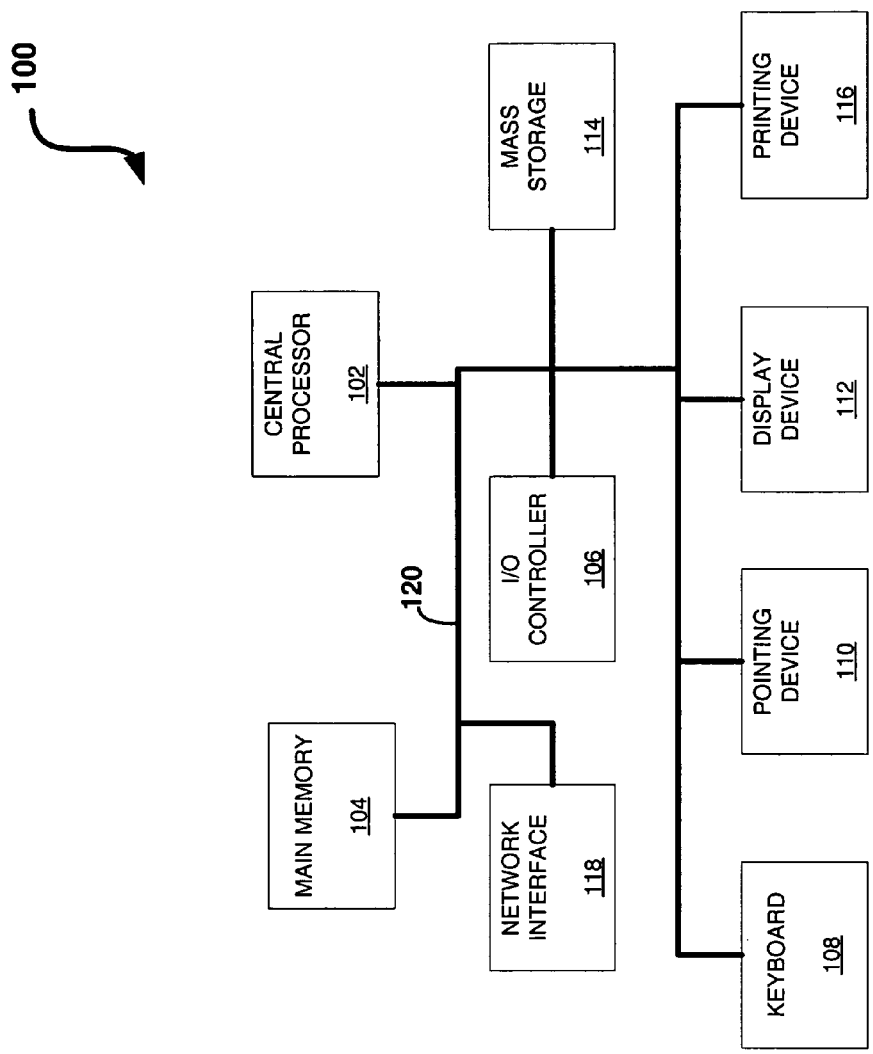
FIG. 1 is an illustration of an embodiment of a computer system.

A method and apparatus are described for predicting and preventing escalations. According to one embodiment, the method includes generating a predictive model from analysis of historical defect data and corresponding historical escalation data, and applying the predictive model to current defect data to determine an escalation risk of the current defect data.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EE-PROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

FIG. 1 illustrates an exemplary computer system 100 in which certain embodiments of the present invention may be implemented. The system 100 comprises a central processor 102, a main memory 104, an input/output (I/O) controller 106, a keyboard 108, a pointing device 110 (e.g., mouse, track ball, pen device, or the like), a display device 112, a mass storage 114 (e.g., a nonvolatile storage such as a hard disk, an optical drive, and the like), and a network interface 118. Additional input/output devices, such as a printing device 116, may be included in the system 100 as desired. As illustrated, the various components of the system 100 communicate through a system bus 120 or similar architecture.

In a further embodiment, system 100 may be a distributed computing system. In other words, one or more of the various components of the system 100 may be located in a physically separate location than the other components of the system 100. Such components may be accessed and connected via a network to the other components In accordance with an embodiment of the present invention, the computer system 100 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 118 provides communication capability with other computer systems on a same local network, on a different network connected via modems and the like to the present network, or to other computers across the Internet. In various embodiments of the present invention, the network interface 118 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network ISL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 100 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 100 is a general purpose computer capable of running any number of applications such as those available from companies including Oracle, Siebel, Unisys, Microsoft, and the like.

Figure 2:
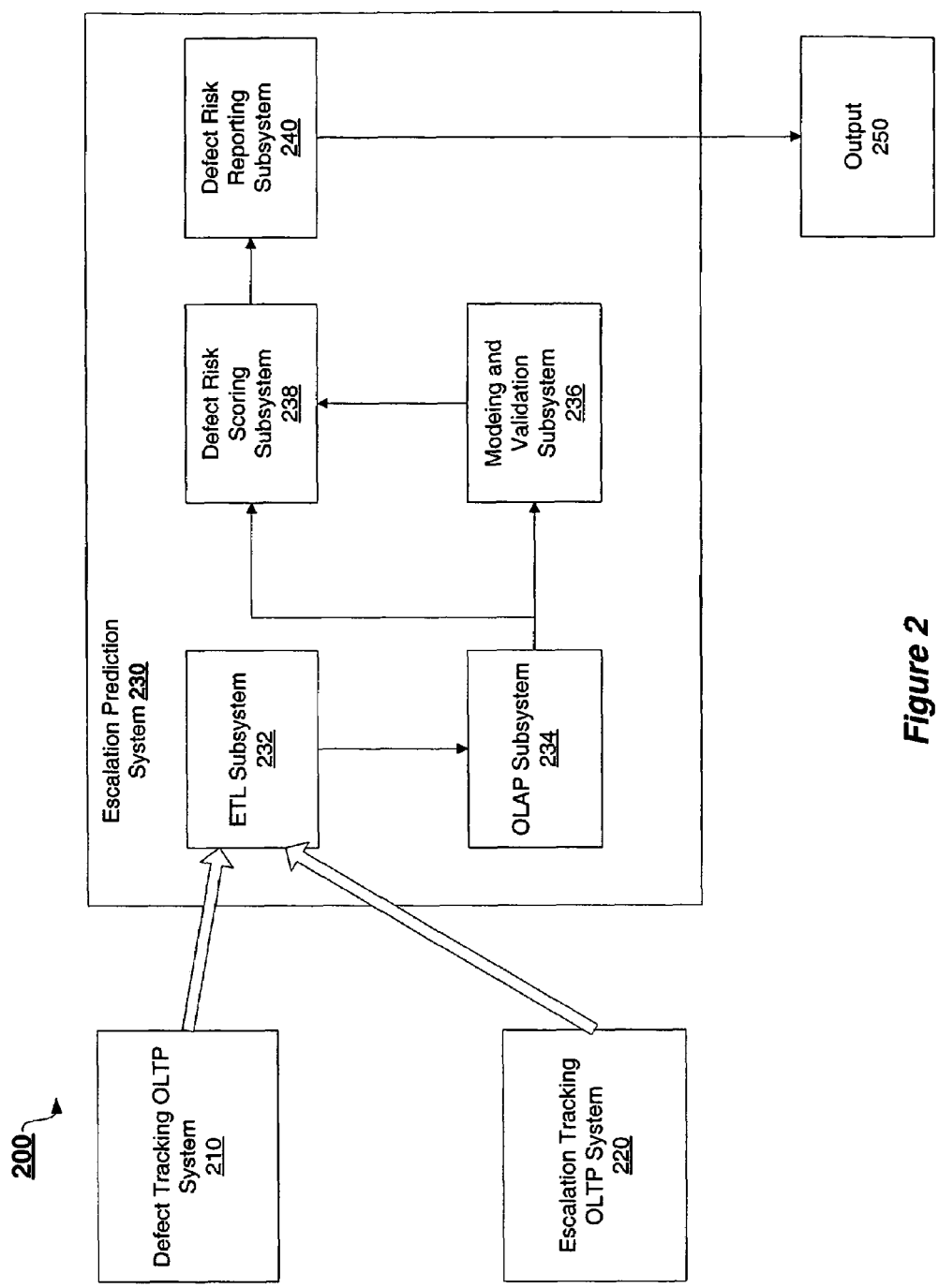
FIG. 2 is a block diagram illustrating one embodiment of an apparatus to predict and prevent escalations.

Referring to FIG. 2, a block diagram illustrating one embodiment of a system 200 to predict and prevent escalations in a software product is presented. System 200 includes a defect tracking Online Transaction Processing (OLTP) system 210, an escalation tracking OLTP system 220, and an escalation prediction system 230. One skilled in the art will appreciate that system 200 may be implemented through a variety of software, firmware, and/or hardware configurations.

In one embodiment, defect tracking OLTP system 210 and escalation tracking OLTP system 220 operate as reporting systems for users to submit information regarding defects and escalations that they have encountered. Any variety of well-known OLTP systems may be utilized for defect tracking OLTP system 210 and escalation tracking OLTP system 220.

In one embodiment, defect tracking OLTP system 210 provides an input means for users to report defects they encounter in a software product. These defects are recorded as data records in the defect tracking OLTP system 210.

Furthermore, in one embodiment, escalation tracking OLTP system 220 provides an input means for customers or end users of a software product to report defects they encounter which required a substantial amount of effort to resolve. In other words, customers and/or end users utilize the escalation OLTP tracking system 220 to report the severity of any defects they encounter. These escalations are recorded as data records in the escalation tracking OLTP system 220.

Escalation prediction system 230 includes an Extract, Transform, and Load (ETL) subsystem 232, Online Analytical Processing (OLAP) subsystem 234, modeling and validation subsystem 236, defect risk scoring subsystem 238, and defect risk reporting subsystem 240. In one embodiment, escalation prediction system 230 receives data relating to the defect and escalation reports submitted to defect OLTP system 210 and escalation OLTP system 220. Escalation prediction system 230 processes this data to determine an accurate escalation risk for each defect. In one embodiment, the escalation risk is the probability that a defect will be elevated to an escalation. This escalation risk is reported to a user through output report 250.

In some embodiments, ETL subsystem 232, OLAP subsystem 234, modeling and validation subsystem 236, defect risk scoring subsystem 238, and defect risk reporting subsystem 240 may be implemented in a computer system, such as system 100 illustrated in FIG. 1. In some embodiments, the subsystems 232-240 may be implemented together in one computer system. In other embodiments, the subsystems 232-240 may be implemented each in their own separate computer systems. Furthermore, some embodiments of the invention may combine the functionalities of subsystems 232-240 into one system or into a multitude of systems. One skilled in the art will appreciate that there are a variety of implementations that may be desired or necessitated by the various embodiments of the invention.

Figure 3:
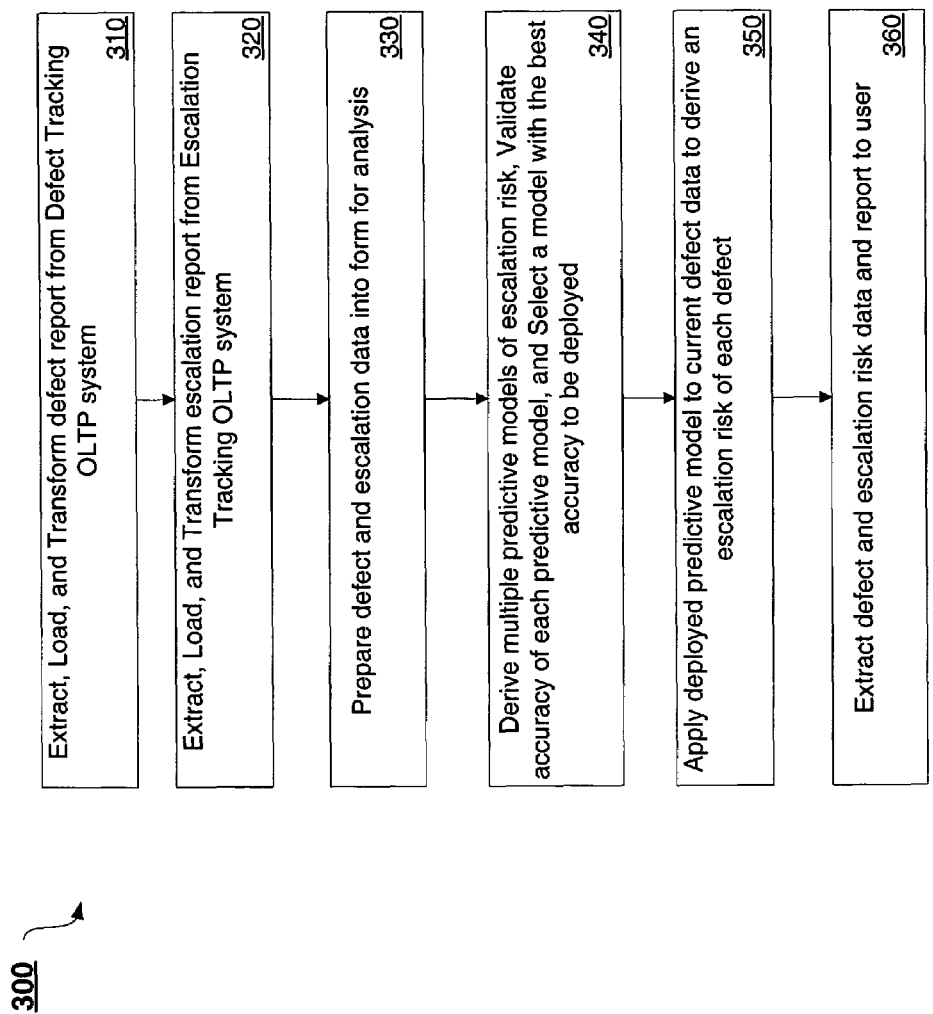
FIG. 3 is a flow diagram illustrating one embodiment of a method to predict and prevent escalations.

Referring now to FIG. 3, a flow diagram illustrating one embodiment of the operation of escalation prediction system 230 is presented. At processing block 310, ETL subsystem 232 extracts, loads, and transforms defect data from the defect tracking OLTP system 210. At processing block 320, ETL subsystem 232 further extracts, loads, and transforms escalation data from the escalation tracking OLTP system 220.

Then, at processing block 330, the OLAP subsystem 234 prepares the defect and escalation data into form for analysis. In one embodiment, the data reported from the ETL subsystem 232 is included with historical data already maintained in the OLAP subsystem 234. The historical data represents past defect reports and the escalation risk scores associated with those defects. One skilled in the art will appreciate that any well-known OLAP operational structure may be utilized to prepare the data.

At processing block 340, the modeling and validation subsystem 236 derives multiple predictive models using the data from the OLAP subsystem 234. Various data mining algorithms and/or machine learning may be utilized to develop the predictive models. These algorithms build models of the hidden patterns in the historical data to create a prediction model to accurately predict an escalation risk for a defect. Examples of data-mining algorithms that may be utilized include, but are not limited to, neural networks, rule induction, self-organizing maps, and regressions.

Continuing with processing block 340, each predictive model is validated by applying it to past defect data to determine escalation risks. The resulting calculated escalation risk is compared to the actual occurrence or non-occurrence of escalations for each particular defect. The predictive model returning the most accurate results is selected to be deployed for use in the escalation prediction system 230.

At processing block 350, the defect risk scoring subsystem 238 applies the deployed predictive model to current defect data to derive an escalation risk for each defect. Finally, at processing block 360, the defect risk reporting subsystem 240 extracts the current defect data and predicted escalation risk determined at processing block 350 by the defect risk scoring subsystem 238, and reports this information to a user(s) as output 250.

Figure 4:
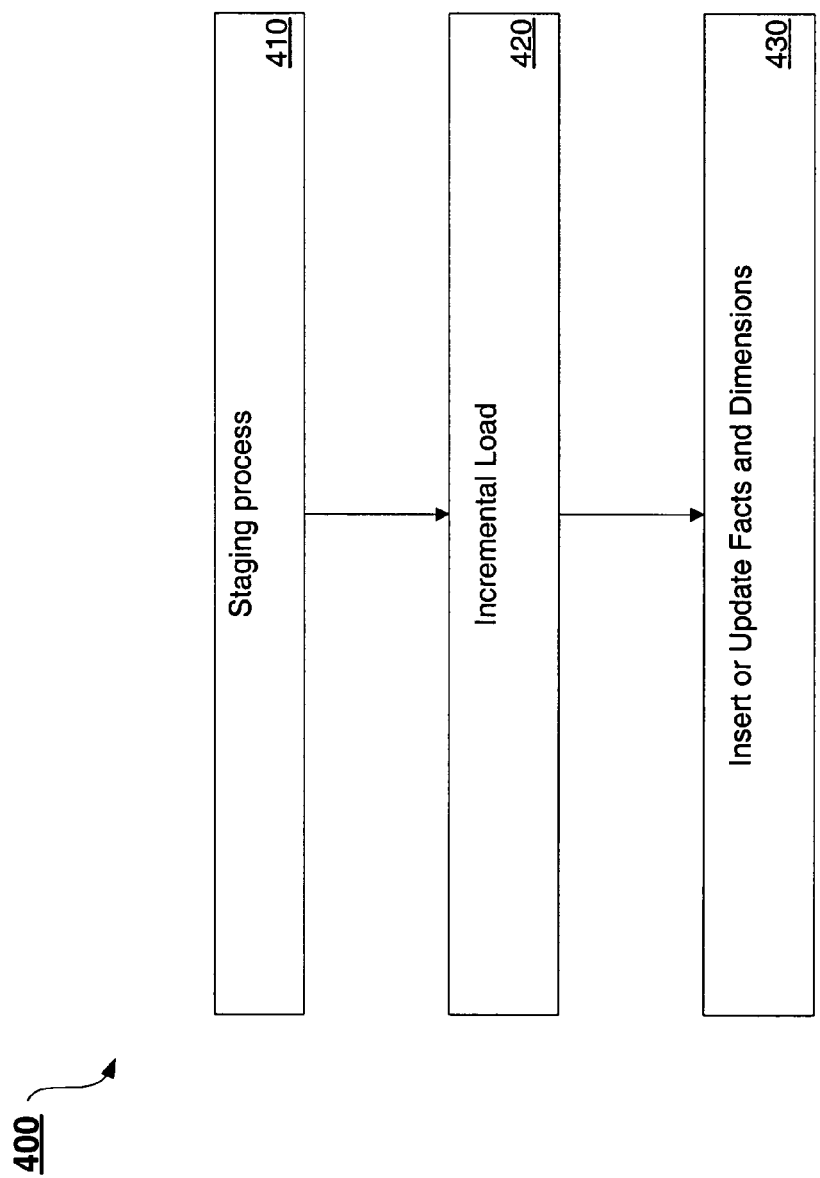
FIG. 4 is a flow diagram illustrating one embodiment of a method of an Extract, Transform, and Load (ETL) system.

Referring now to FIG. 4, a flow diagram illustrating one embodiment of the operation of the ETL subsystem 232 is shown. At processing block 410, the ETL performs a staging process. In one embodiment, the staging process is used to extract all defect reports from the defect tracking OLTP system 210 by performing a query to return a data set.

Then, at processing block 420, the ETL 232 incrementally loads defect and escalation reports from the defect OLTP system 210 and escalation OLTP system 200. In one embodiment, the extracted data is analyzed to determine whether the data report has changed from the most recently extracted version of the report. If there is no change, then the report data in the staging schema is discarded because it contains no new information. If there are one or more changes or new defect reports, the ETL 232 inserts or updates facts and dimensions into the OLAP database 234 at processing block 430.

Figure 5:
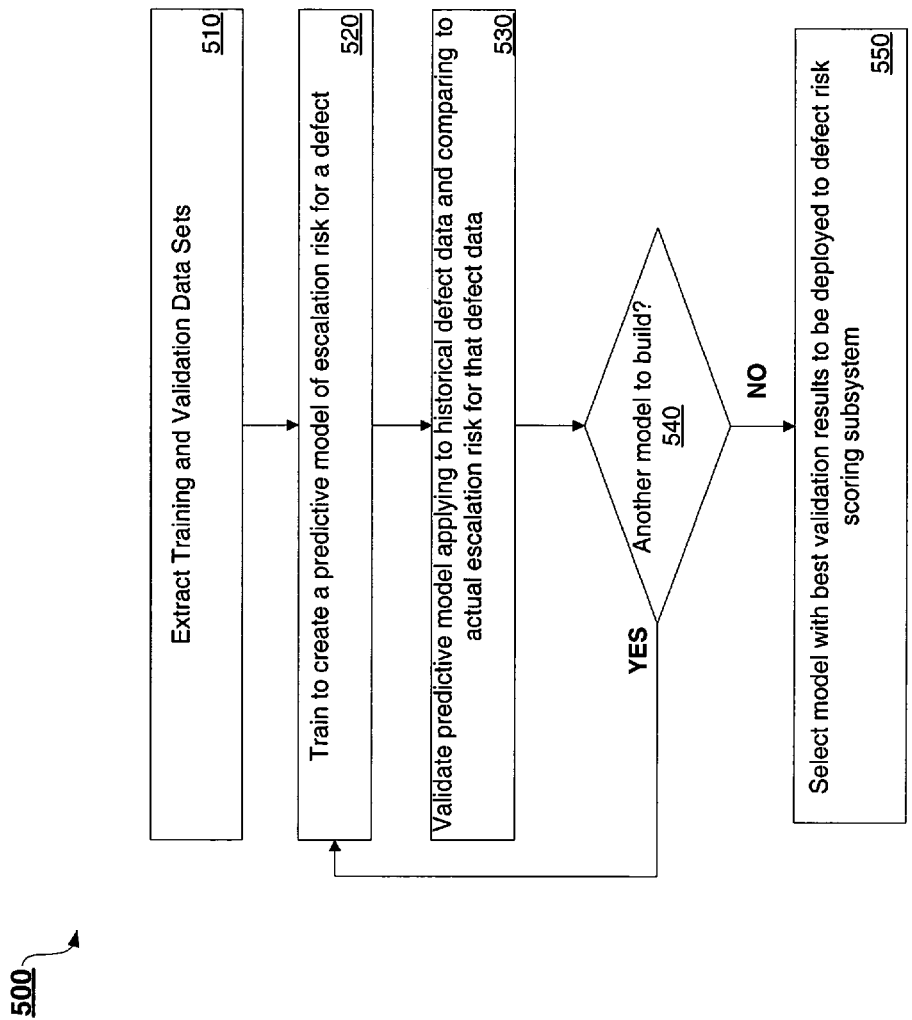
FIG. 5 is a flow diagram illustrating one embodiment of a method of a modeling and validation system.

FIG. 5 is a flow diagram illustrating one embodiment of the operation of the modeling and validation subsystem 236. At processing block 510, the modeling and validation subsystem 236 extracts training and validation data sets from the OLAP subsystem 234. In one embodiment, the training sets include all historical defect data records and their corresponding escalation occurrence data. The validation sets include all current defect data records that require an escalation risk prediction.

At processing block 520, a predictive model is created through training. In one embodiment, training refers to the process of learning from past defects and escalation occurrences to model future escalation risks. This training may be accomplished through the use of any well-known data mining algorithms and/or machine learning, such as the examples mentioned above with respect to FIG. 3.

At decision block 530, the predictive model built at processing block 520 is validated. This validation is accomplished by comparing the escalation risks derived by applying the predictive model to historical defect data records to the actual escalation occurrences or non-occurrences associated with those defects. In one embodiment, the validation may be done by utilizing a truth matrix or a matrix of confusion. These matrixes illustrate the number of cases in which the predictive model correctly predicted escalation risks. However, the efficacy (i.e., quality, value, or usefulness) of each model may be measured and quantified using any of the various techniques known to those skilled in the art.

At decision block 540, the modeling and validation subsystem 236 determines whether another predictive model should be built. In one embodiment, a pre-determined number of predictive models to build may be pre-programmed into the subsystem 236. In another embodiment, the modeling and validation subsystem 236 may continue to build and validate models until a specified threshold of model efficacy is reached, or until a maximum number of models have been built.

If it is determined that another model should be built, the process returns to processing block 520 to build and validate another model. Otherwise, if all necessary models are built, the processing continues to processing block 550 where the predictive model that returned the best validation results is deployed to the defect risk scoring subsystem 238.

Figure 6:
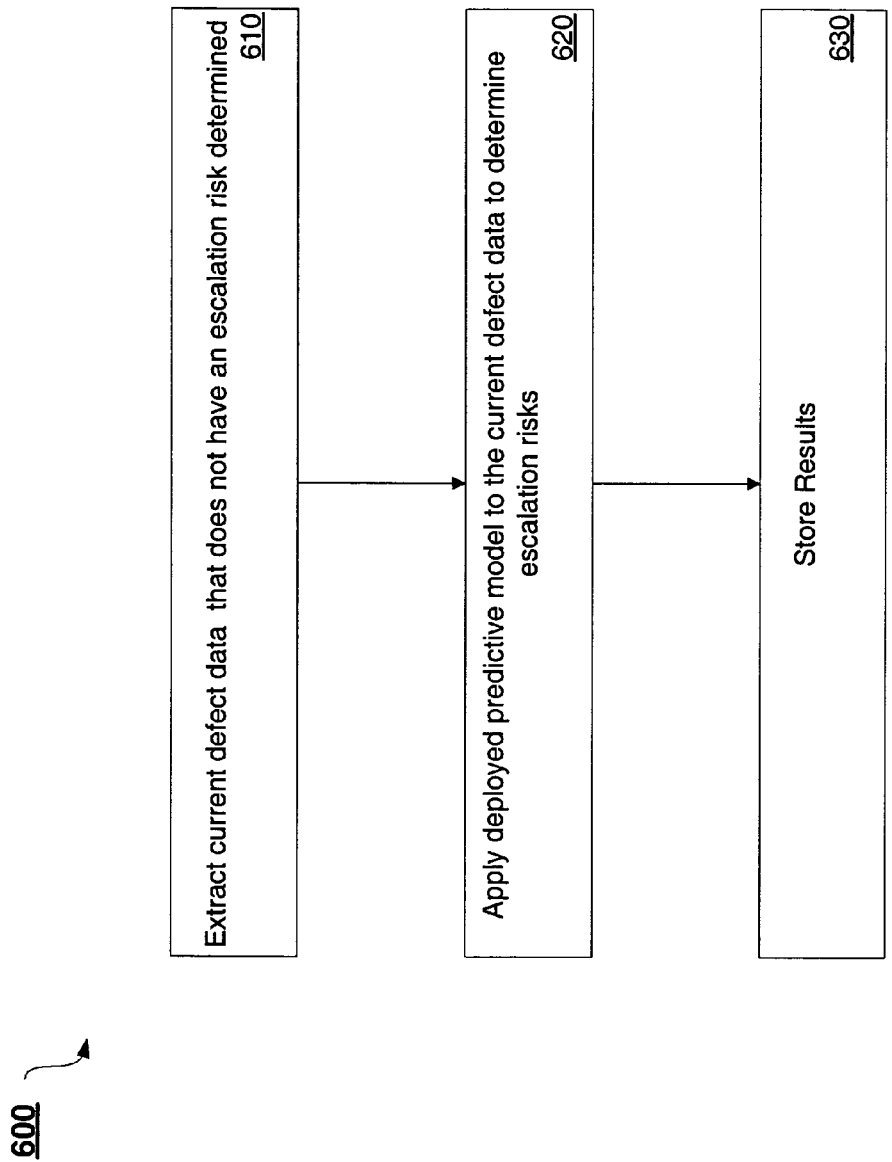
FIG. 6 is a flow diagram illustrating one embodiment of a method of a defect risk scoring system.

FIG. 6 illustrates a flow diagram depicting one embodiment of the operation of the defect risk scoring subsystem 238. At processing block 610, current defect data is extracted for analysis. In one embodiment, all defect reports that have been submitted within a predetermined number of days (e.g., the last 90 days) may be considered "current". In other embodiments, all defects that are marked as "not yet resolved" or "open" may be considered "current." One skilled in the art will appreciate that any combination of these and other similar criteria may be used to select a set of "current" defect data.

At processing block 620, the defect data is applied to the predictive model deployed from the modeling and validation subsystem 236 to determine escalation risks for the defects. Finally, at processing block 630, the defect data and corresponding predicted escalation risks are stored.

Figure 7:
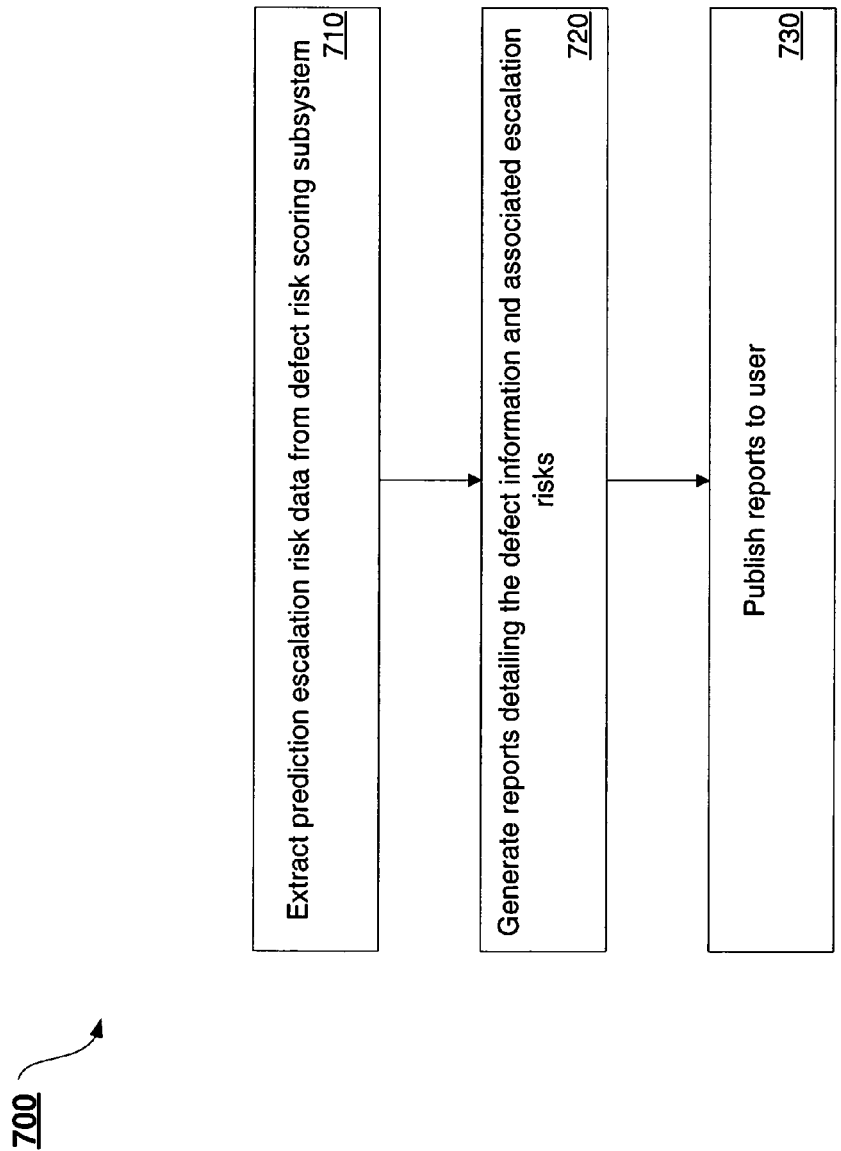
FIG. 7 is a flow diagram illustrating one embodiment of a method of a defect risk reporting system.

Referring now to FIG. 7, a flow diagram illustrating one embodiment of the operation of the defect risk reporting subsystem 240 is presented. At processing block 710, the defect data and corresponding escalation risks are extracted from the defect risk scoring subsystem 238. Then, at processing block 720, a report is generated detailing this data. In one embodiment, the report may include various information relating to the defect, including but not limited to: date defect occurred, defect ID, synopsis, submit date, priority, severity, and escalation risk. One skilled in the art will appreciate that the report may include a combination of the above information or other information detailing the defect and predicted escalation risk. Finally, at processing block 730, the report is published as output 250 to users.

In embodiments of the invention, the various components of escalation prediction system 230 may operate on differing timetables. For example, modeling and validation subsystem 236 may model, validate, and deploy an updated prediction model on a quarterly basis. At the same time, ETL subsystem 232, OLAP system 234, defect risk scoring subsystem 238, and defect risk reporting subsystem 240 may operate on a weekly basis to predict escalation risks and create reports 250 for a user(s). In such an embodiment, these components will utilize the most recently deployed prediction model until the modeling and validation subsystem 236 creates a new model.

Referring back to FIG. 2, when the modeling and validation subsystem 236 deploys a predictive model less frequently than escalation risks are predicted for defects, the process flow in the escalation prediction system 230 would be as follows: from the ELT subsystem 232, to the OLAP subsystem 234, to the defect risk scoring subsystem 238, and finally to the defect risk reporting subsystem 240. The modeling and validation subsystem 236 would be skipped until a new prediction model is created. One skilled in the art will appreciate that a variety of implementations may be used to satisfy the requirements of different computer systems and users.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
   generating a predictive model from analysis of historical defect data and corresponding historical escalation data, including modeling a plurality of predictive models through a data-mining algorithm by examining patterns of the historical defect data and the historical escalation data, and validating each predictive model of the plurality of predictive models by comparing a predicted escalation risk determined by a predictive model with the historical escalation data associated with the defect; and
   applying the predictive model with the best validation accuracy to current defect data to determine an escalation risk of the current defect data.

2. The method of claim 1, further comprising:
   extracting the historical and current defect data from a defect tracking system; and
   preparing the historical and current defect data in an Online Analytical Processing (OLAP) system for analysis.

3. The method of claim 1, further comprising extracting the current defect data and the determined escalation risk of the current defect data to report to a user.

4. The method of claim 1, further comprising:
   extracting the historical escalation data from an escalation tracking system; and
   preparing the historical escalation data in the OLAP system for analysis.

5. The method of claim 4, wherein the data-mining algorithm is selected from the group including neural networks, rule induction, self-organizing maps, and regressions.

6. The method of claim 5, wherein validating each of the plurality of predictive models further includes utilizing a truth matrix to determine the accuracy of the predictive model.

7. The method of claim 4, wherein the defect tracking system and the escalation tracking system are Online Transaction Processing (OLTP) systems.

8. The method of claim 1, wherein the escalation risk is a probability of the defect being escalated by a user.

9. A computer readable storage medium including data that, when accessed by a machine, cause the machine to perform operations comprising:
   generating a predictive model from analysis of historical defect data and corresponding historical escalation data, including modeling a plurality of predictive models through a data-mining algorithm by examining patterns of the historical defect data and the historical escalation data, and validating each predictive model of the plurality of predictive models by comparing a predicted escalation risk determined by a predictive model with the historical escalation data associated with the defect; and
   applying the predictive model with the best validation accuracy to current defect data to predict an escalation risk of the current defect data.

10. The computer readable storage medium of claim 9, wherein the machine-accessible medium further includes data that cause the machine to perform operations comprising:
    extracting the historical and current defect data from a defect tracking system;
    preparing the historical and current defect data in an Online Analytical Processing (OLAP) system for analysis; and
    reporting the current defect data and the predicted escalation risk of the current defect data to report to a user.

11. The computer readable storage medium of claim 10, wherein the machine-accessible medium further includes data that cause the machine to perform operations comprising:
    extracting the historical escalation data from an escalation tracking system; and
    preparing the historical escalation data in the OLAP system for analysis.

12. The computer readable storage medium of claim 11, wherein the data-mining algorithm is selected from the group including neural networks, rule induction, self-organizing maps, and regressions.

13. The computer readable storage medium of claim 11, wherein the defect tracking system and the escalation tracking system are Online Transaction Processing (OLTP) systems.

14. An apparatus, comprising an escalation prediction system to predict escalations and further including:
- a modeling and validation system to generate a predictive model from analysis of historical defect data and corresponding historical escalation data, including modeling a plurality of predictive models through a data-mining algorithm by examining patterns of the historical defect data and the historical escalation data, and validating each predictive model of the plurality of predictive models by comparing a predicted escalation risk determined by a predictive model with the historical escalation data associated with the defect; and
- a defect risk scoring system to apply the predictive model with the best validation accuracy to current defect data to predict an escalation risk of the defect.

15. The apparatus of claim 14, further including an Extract, Transform, and Load (ETL) system to extract the historical defect data and the current defect data from a defect tracking system and to extract the historical escalation data from an escalation tracking system;
- an Online Analytical Processing (OLAP) system to prepare the historical and current defect data for analysis; and
- a defect risk reporting system to extract and report the current defect data and the predicted escalation risk from the defect risk scoring system.

16. The apparatus of claim 14, wherein the defect tracking system and the escalation tracking system are Online Transaction Processing (OLTP) systems receive defect and escalation reports.

17. The apparatus of claim 15, wherein the data-mining algorithm is selected from the group including neural networks, rule induction, self-organizing maps, and regressions.

\* \* \* \* \*

UNITED STATES PATENT AND TRADEMARK OFFICE
CERTIFICATE OF CORRECTION

| | | |
|---|---|---|
| PATENT NO. | : 7,607,046 B1 | Page 1 of 1 |
| APPLICATION NO. | : 11/123401 | |
| DATED | : October 20, 2009 | |
| INVENTOR(S) | : Tilmann Bruckhaus | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this

Twelfth Day of October, 2010

David J. Kappos
*Director of the United States Patent and Trademark Office*